US010035918B2

(12) United States Patent
Kibe et al.

(10) Patent No.: US 10,035,918 B2
(45) Date of Patent: Jul. 31, 2018

(54) CARBON NANOTUBE COATING COMPOSITION

(71) Applicants: NITTO DENKO CORPORATION, Ibaraki-shi, Osaka (JP); Rice University, Houston, TX (US)

(72) Inventors: Ryuta Kibe, Ibaraki (JP); Takayuki Yamamoto, Ibaraki (JP); Laurent Maillaud, Houston, TX (US); Robert James Headrick, Houston, TX (US); Francesca Mirri, Houston, TX (US); Matteo Pasquali, Houston, TX (US)

(73) Assignees: NITTO DENKO CORPORATION, Ibaraki-shi, Osaka (JP); Rice University, Houston, TX (US)

( * ) Notice: Subject to any disclaimer, the term of this patent is extended or adjusted under 35 U.S.C. 154(b) by 115 days.

(21) Appl. No.: 14/845,629

(22) Filed: Sep. 4, 2015

(65) Prior Publication Data

US 2016/0068690 A1    Mar. 10, 2016

Related U.S. Application Data

(60) Provisional application No. 62/046,866, filed on Sep. 5, 2014.

(51) Int. Cl.
| H01B 1/04 | (2006.01) |
| C01B 32/174 | (2017.01) |
| C09D 11/52 | (2014.01) |
| B82Y 30/00 | (2011.01) |
| C09D 5/24 | (2006.01) |
| C09D 7/40 | (2018.01) |
| C08K 3/04 | (2006.01) |

(52) U.S. Cl.
CPC ............... *C09D 5/24* (2013.01); *C09D 7/67* (2018.01); *C09D 7/70* (2018.01); *B82Y 30/00* (2013.01); *C08K 3/041* (2017.05); *C08K 2201/011* (2013.01)

(58) Field of Classification Search
CPC .......... H01B 1/24; H01B 1/04; C01B 32/158; C01B 32/159; C01B 32/168; C01B 2202/28; C01B 31/0273; B82Y 30/00; B82Y 40/00
USPC ................................. 252/502, 510; 427/122
See application file for complete search history.

(56) References Cited

U.S. PATENT DOCUMENTS

| 2006/0099135 A1* | 5/2006 | Yodh | .............. B82Y 10/00 423/447.1 |
| 2009/0317660 A1* | 12/2009 | Heintz | ................ B82Y 10/00 428/688 |
| 2010/0252184 A1* | 10/2010 | Morimoto | ............. B82Y 30/00 156/241 |

(Continued)

OTHER PUBLICATIONS

Shin ("Improvement of single-walled carbon nanotube transparent conductive films using substrate pretreatment." Synth Metals, 161, pp. 1596-1599, pub Jun. 14, 2011).*

(Continued)

*Primary Examiner* — Tri V Nguyen
(74) *Attorney, Agent, or Firm* — Sughrue Mion, PLLC

(57) ABSTRACT

The present invention relates to a composition comprising carbon nanotubes and a surfactant for forming a thin film on a substrate, and a method of manufacturing a thin film on a substrate by using an aqueous dispersion of the composition comprising carbon nanotubes and a surfactant.

3 Claims, 3 Drawing Sheets

(56) References Cited

U.S. PATENT DOCUMENTS

2011/0036829 A1\* 2/2011 Fugetsu .............. H05B 3/145
219/541
2011/0048772 A1\* 3/2011 Han ................. C09D 11/52
174/257
2015/0210065 A1\* 7/2015 Kelly ................ C08K 7/24
347/103

OTHER PUBLICATIONS

Goak ("Spectroscopic studies and electrical properties of transparent conductive films fabricated by using surfactant-stabilized single-walled carbon nanotube suspensions." Carbon, 49, pp. 4301-4313, pub Jun. 7, 2011).\*

White ("Zeta-Potential Measurements of Surfactant-Wrapped Individual Single-Walled Carbon Nanotubes." JPC C, 111, pp. 13684-13690, pub 2007).\*

Tan ("Dispersion of Single-Walled Carbon Nanotubes of Narrow Diameter Distribution." JPC B, 109, 14454-14460, pub 2005).\*

Dow ("Alkyl Diphenyl Oxide Sulfonates (ADPODS) HPV Challenge Program Category, Test Plan and Robust Summaries of Data for HPV/SIDS Endpoints." Online Dec. 20, 2002 from https://iaspub.epa.gov/oppthpv/document_api.download?FILE=Test%20Plan%20sn174.pdf).\*

\* cited by examiner

| CNT | CNT concentration | Substrate | Surfactant concentration | Surfactant | Wettability |
|---|---|---|---|---|---|
| EC2.0 (Meijo Nano Carbon) | 1mg/ml | PET (T104, Mitsubishi plastic films) | 0.5%wt | Dowfax 2A1 | OK |
| | | | | SDBS | No |
| | | | | Triton X100 | No |
| | | | | Deoxycholate | No |

Coating: Mayer rod, auto coating machine(1.2 inch/sec)
Dryer: 90 Celsius, 30min

CARBON NANOTUBE COATING COMPOSITION

This application claims priority based on Provisional Application No. U.S. 62/046,866 filed Sep. 5, 2014, the contents of which are incorporated herein by reference in their entirety.

FIELD OF THE INVENTION

The present invention relates generally to a coating composition containing an aqueous dispersion comprising carbon nanotubes and a surfactant for coating a substrate, and to a method of manufacturing the coating composition. More specifically, the present invention relates to a coating composition that forms a transparent, flexible and conductive film on a substrate, and a method of manufacturing and forming the film on a substrate.

BACKGROUND OF THE INVENTION

Carbon nanotubes have optimal properties, such as high conductivity, high aspect ratio and high mechanical strength, for numerous applications. In the production of electrodes for the development of, for example, novel touch screens, photovoltaic panels and light-emitting diodes, the production of transparent, conductive and flexible electrodes is a major challenge because current technologies use costly and brittle inorganic oxides. For example, films formed from compositions containing inorganic oxides (such as indium tin oxide films) have good conductivity but are brittle and expensive to produce. Carbon nanotubes are viewed as potential alternatives to inorganic oxides in numerous applications, such as in the development of a coating composition for coating a substrate. Since carbon nanotubes have a high aspect ratio and excellent mechanical and electrical properties, they can form conductive networks at low density on flexible surfaces and thus form a film that has an optimal balance of conductivity and optical transparency properties.

However, in the case of, for example, a coating composition containing carbon nanotubes for coating a substrate, existing compositions containing carbon nanotubes can be difficult to apply on substrates in the manufacturing process and may not be suitable for forming a homogenous film having a combination of desired properties. For example, when manufacturing a film using a carbon nanotube composition and sulfonic acid in a filtration process without the use of a surfactant, manufacturing equipment and materials may be damaged and a filtration process is difficult to apply in mass production. Further, due to the hydrophobic surface of carbon nanotubes, a surfactant is needed in order to disperse the carbon nanotubes. However, as another example, when manufacturing a film using a carbon nanotube composition and a surfactant, a homogenous film having good flexibility and conductivity can be formed but it may be difficult to remove the surfactant from the carbon nanotubes at the end of the manufacturing process. In addition, it is difficult to use a carbon nanotube composition to form a homogenous film having good wettability characteristics on a substrate, such as a plastic substrate. For example, when a carbon nanotube composition and a surfactant such as Triton™ X, sodium dodecylbenzene sulfonate (SDBS) or sodium deoxycholate (DOC) are used to form a film on a plastic substrate, these surfactants are unable to effectively lower the surface tension and thus fail to avoid dewetting effects. Accordingly, it is desired to obtain a carbon nanotube film that can be homogenously applied on a substrate, such as a plastic substrate, where the carbon nanotube film has excellent flexibility and conductivity properties, good optical transparency and improved wettability characteristics.

SUMMARY OF THE INVENTION

The present invention is a composition comprising carbon nanotubes and a surfactant, and a method of manufacturing a film on a substrate by using an aqueous dispersion containing a composition comprising carbon nanotubes and a surfactant. A film that is formed on a substrate using the composition of the present invention has excellent flexibility and conductivity properties, good optical transparency and improved wettability characteristics. In the present invention, the aqueous dispersion of carbon nanotubes and the surfactant can be deposited as a thin liquid film over a substrate, such as a plastic substrate, without dewetting effects. As a result, high performance transparent, flexible and conductive films can be formed on substrates from aqueous dispersions by a scalable method.

More specifically, the present invention is a composition that comprises carbon nanotubes and a surfactant, wherein the surfactant is represented by the following Formula 1:

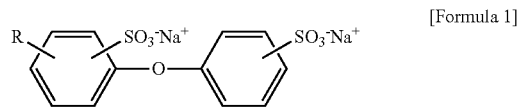

[Formula 1]

wherein R represents an alkyl group, such as a linear or branched alkyl group having 6 to 16 carbon atoms. Surfactants commercially sold as Dowfax™ (manufactured by The Dow Chemical Co.). Preferably, the surfactant is Dowfax™ 2 A1, which is commercially solds in order to provide good detergency.

In another aspect, the present invention provides a method of manufacturing a film on a substrate by using an aqueous dispersion of the composition comprising carbon nanotubes and a surfactant, wherein the surfactant is represented by Formula 1. In one embodiment, the method for manufacturing the film comprises the steps of: mixing a surfactant represented by Formula 1 into water; adding carbon nanotubes into the mixture; sonicating the mixture of surfactant, water and carbon nanotubes; centrifuging the resulting mixture; coating the resulting mixture on a substrate to obtain a liquid film on the substrate; and drying the film on the substrate.

Other features, objects, and advantages of the present invention are apparent in the detailed description that follows. It should be understood, however, that the detailed description, while indicating preferred embodiments of the invention, are given by way of illustration only, not limitation. Various changes and modifications within the scope of the invention will become apparent from the detailed description to those skilled in the art.

DETAILED DESCRIPTION OF THE INVENTION

Figure 1:
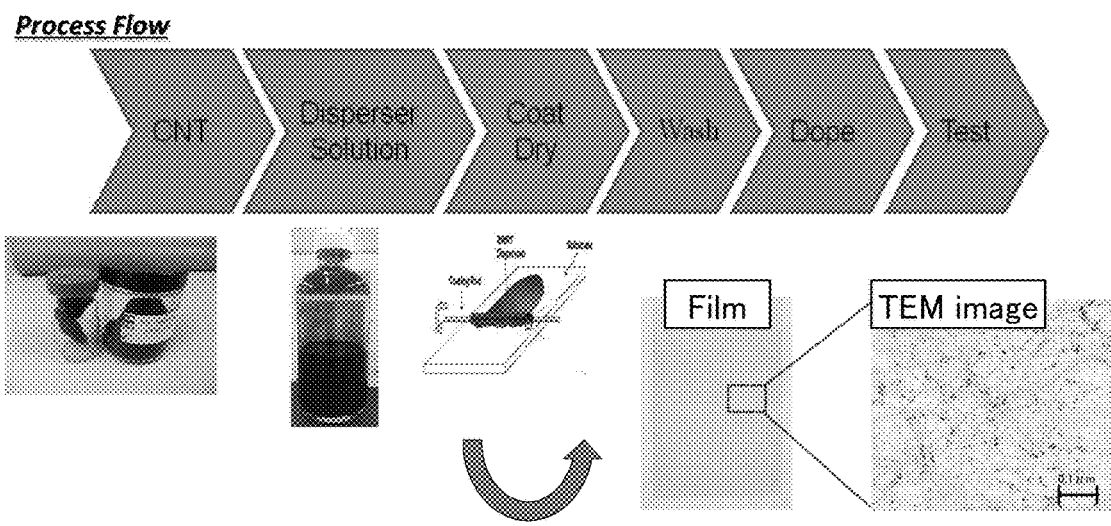
FIG. 1 is a schematic diagram illustrating the method of manufacturing a film on a substrate of the present invention.

It is to be understood that the present invention is not limited to the particular embodiments described, as such aspects may vary.

The composition of the present invention is a carbon nanotube composition for forming a thin film to coat a substrate. The composition comprises carbon nanotubes and a surfactant, wherein the surfactant is represented by Formula 1:

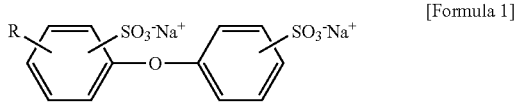

[Formula 1]

wherein R represents an alkyl group, such as a linear or branched alkyl group having 6 to 16 carbon atoms.

The surfactant in the composition is used for dispersing the carbon nanotubes and to obtain excellent wettability characteristics for the film that is coated on the substrate. Surfactants commercially sold as Dowfax™ (manufactured by The Dow Chemical Co.) can be used. Preferably, the surfactant is commercially sold as Dowfax™ 2 A1 in order to provide good detergency. When an aqueous dispersion of the composition containing Dowfax™ 2 A1 as the surfactant is coated on a plastic substrate, surface tension is effectively minimized such that there are no dewetting effects.

The composition contains an amount of 0.05 to 5% wt. of the surfactant. When the composition contains an amount of 0.05 to 5% wt. of the surfactant, the surfactant can disperse the carbon nanotubes well and form a homogenous film on the substrate. Preferably, the composition contains an amount of 0.5 to 1% wt. of the surfactant, in order to avoid having too much surfactant remaining on the final dried film that is coated on the substrate. However, when the composition contains an amount of surfactant that is below 0.05% wt., the amount of surfactant is not sufficient for forming a homogenous film on the substrate (the amount of surfactant is not sufficient for obtaining a good viscosity and surface tension). Further, when the composition contains an amount of surfactant that exceeds 5% wt., the surfactant may initiate too many interactions (depletion interactions) with the carbon nanotubes, which leads to undesired carbon nanotube aggregation.

The carbon nanotubes in the composition are not particularly limited. For example, single-wall carbon nanotubes, double-wall carbon nanotubes, triple-wall carbon nanotubes and multi-wall carbon nanotubes may be used. Single-wall carbon nanotubes are most preferably used to form transparent and conductive films. For example, SWNT eDIPS EC 2.0 carbon nanotubes (manufactured by Meijo Nano Carbon Co., Ltd.), which contains mainly single-wall carbon nanotubes but may also include double-wall and triple-wall carbon nanotubes, may be used. Preferably, the carbon nanotubes have a diameter of 0.8 nm to 3 nm and a length of 0.5 μm to more than 10 μm. The physical dimensions of the carbon nanotubes are preferably the smallest diameter combined with the longest length. In addition, high quality carbon nanotubes (for example, having a G/D ratio larger than 35) are preferably used. The composition contains an amount of 0.01% wt. to 5% wt. of carbon nanotubes, preferably an amount of 0.05% wt. to 0.2% wt. of carbon nanotubes.

The range of the weight ratio of carbon nanotubes to surfactant in the composition is 1:1 to 1:500. The weight ratio of carbon nanotubes to surfactant in the composition is preferably 1:4.8 to 1:9.6. When the weight ratio is 1:1 to 1:500, the surfactant can disperse the carbon nanotubes well and form a homogeneous film. However, when the weight ratio is below 1:1, the amount of surfactant is not sufficient for forming a homogenous film on the substrate (the amount of surfactant is not sufficient for obtaining a good viscosity and surface tension). Further, when the weight ratio exceeds 1:500, the surfactant may initiate too many interactions (depletion interactions) with the carbon nanotube, which leads to undesired carbon nanotube aggregation. A weight ratio of carbon nanotubes to surfactant in the composition is preferably 1:4.8, where the surfactant is Dowfax™ 2 A1.

The substrate is not particularly limited. A transparent and conductive film formed using an embodiment of the method of the present invention may be applied to any article having a rigid or flexible substrate, and the substrate may be transparent, translucent, opaque or colored. The substrate can be a metal, glass or plastic substrate. Preferably, the substrate is a plastic substrate since a plastic substrate is more flexible. Among plastic substrates, polymeric substrates are preferred because of their compatibility with transparent and conductive films and ease of use. The polymeric substrates are chosen depending on the properties required by the final application (such as being held at elevated temperatures and resistance to aging). Thus, the flexible polymeric substrates are preferably selected from polyethylene terephthalate (PET), polyethylene naphthalate (PEN), polyethersulfone (PES), polycarbonate (PC), polysulfone (PSU), phenolic resins, epoxies, polyesters, polyimides, polyether esters, polyether amides, polyvinyl (acetate), cellulose nitrate, cellulose acetate, polystyrene, polyolefins, polyamide, aliphatic polyurethanes, polyacrylonitrile, polytetrafluoroethylene (PTFE), polymethyl methacrylate (PMMA), polyarylate, polyether imides, polyether ketones (PEK), the polyether ether ketones (PEEK) and polyvinylidene fluoride (PVDF). Most preferably, the substrate is a flexible polymeric substrate selected from polyethylene terephthalate (PET), polyethylene naphthalate (PEN) and polyether sulfone (PES) substrates.

In the method for manufacturing a film on a substrate of the present invention, an aqueous dispersion containing the composition comprising carbon nanotubes and the surfactant is formed. In the aqueous dispersion, the carbon nanotubes are as individualized as possible in order to form the most homogeneous transparent film. Further, other substances, such as nano silica, metal particles or a conductive polymer, may be added to aqueous dispersion in order to improve conductivity and transparency.

Figure 4:
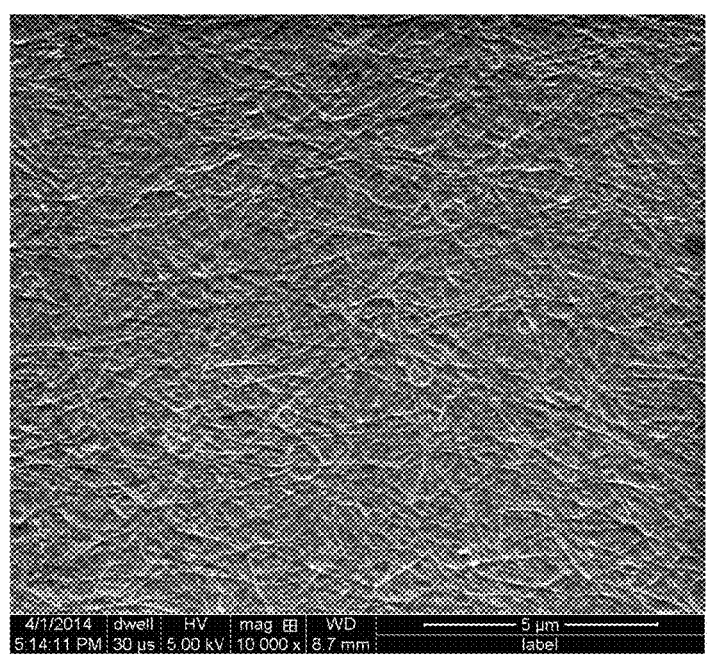
FIG. 4 is a SEM image of the surface of a carbon nanotube/Dowfax™ 2 A1 film after water washing.

In one embodiment, the method for manufacturing a film on a substrate comprises the steps of: mixing a surfactant represented by the Formula 1 into distilled water; adding carbon nanotubes into the mixture; sonicating the mixture of surfactant, water and carbon nanotubes; centrifuging the resulting mixture; coating the resulting mixture on a substrate to obtain a liquid film on the substrate; and drying the film on the substrate. FIG. 1 illustrates the steps of the method of manufacturing a film on a substrate. Further, FIG. 4 shows a SEM image of the surface of a film formed using an embodiment of the method of the present invention after subjecting the film to water washing for 10 minutes.

In the method for manufacturing a film on a substrate, an amount of 0.05 to 5% wt. of the surfactant and an amount of 0.01% wt. to 5% wt. of carbon nanotubes are included in the composition. Preferably, the composition contains an amount of 0.5 to 1% wt. of the surfactant and an amount of 0.05% wt. to 0.2% wt. of carbon nanotubes. The weight ratio of the carbon nanotubes to surfactant is 1:1 to 1:500, and preferably 1:4.8 to 1:9.6.

In the coating step, the resulting mixture is deposited on the substrate as a thin homogenous film. The film deposited on the substrate has a thickness of 10 nm to 2 μm. The method of the film deposition is not particularly limited. For example, the film may be deposited on the substrate using a method such as a Mayer rod coating method, a slot-die coating method, spray or gravure.

In the drying step, the liquid film may be dried in an oven. For example, the liquid film may be dried in an oven at a temperature of 90° C. for 15 minutes. In one embodiment, the liquid film may be dried in a first drying step, subjected to a water washing step, and then dried in a second drying step.

The film that is formed on the substrate has excellent flexibility and conductivity properties, good optical transparency and excellent wettability characteristics. In particular, when the film is formed on a plastic substrate by using Dowfax™ 2 A1 as the surfactant, surface tension is effectively minimized such that there are no dewetting effects.

EXAMPLE 1

A composition is prepared by dispersing 10 mg single-wall carbon nanotubes (CG301X manufactured by South-West NanoTechnologies, Inc.) in distilled water in the presence of 100 mg of an aqueous solution of Dowfax™ 2 A1 (manufactured by The Dow Chemical Co.), with a solid content of 48% using an ultrasonic tip for 10 minutes to obtain a carbon nanotube dispersion. Subsequently, the carbon nanotube dispersion was centrifuged at 12,000 g for 30 minutes. The resulting composition prepared has a weight ratio of carbon nanotube to Dowfax™ 2 A1 of 1:4.8. The surfactant concentration in the composition is 0.48% wt.

The resulting liquid composition is deposited on a transparent plastic film by using a rod coating machine to form a liquid film on the transparent plastic film. The liquid film is dried in an oven for 15 minutes at a temperature of 90° C., subjected to a water washing step for 1 minute, and then dried again for 15 minutes at a temperature of 90° C. The resulting transparent film has a surface resistance Rs of 300 Ω/sq and a transmittance T of 90% at 550 nm.

COMPARATIVE EXAMPLES

In comparison, when a carbon nanotube composition and a surfactant such as Triton™ X, sodium dodecylbenzene sulfonate (SDBS) or sodium deoxycholate (DOC) are used to form a film on a plastic substrate, these surfactants are unable to effectively lower the surface tension and thus fail to avoid dewetting effects.

Figure 2:
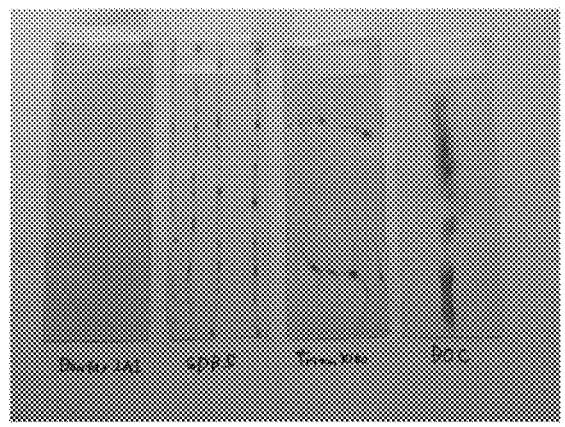
FIG. 2 illustrates films that are formed using an embodiment of the method of the present invention where the surfactant concentration is 0.5% wt.

For example, for the films shown in FIG. 2, each film is manufactured by mixing an amount of 0.5% mass ratio of each surfactant (Dowfax™ 2 A1, SDBS, Triton™ X-100 and DOC) into 10 ml of water; adding 10 mg of SWNT eDIPS EC 2.0 carbon nanotubes (manufactured by Meijo Nano Carbon Co., Ltd.) into the mixture; sonicating the mixture of surfactant, water and carbon nanotubes at 15 W for 30 minutes; coating the resulting mixture on a PET substrate by using a Mayer rod coating machine (wet thickness is 13.72 μm, 1.2 inch/sec) to obtain a liquid film on the PET substrate; and drying the film on the substrate at 90° C. for 15 minutes. When Dowfax™ 2 A1 was used as the surfactant to obtain the film on the PET substrate, a homogenous film on the PET substrate was obtained. However, when Triton™ X, sodium dodecylbenzene sulfonate (SDBS) or sodium deoxycholate (DOC) was used to obtain the film on a plastic substrate, a homogeneous film was not obtained due to high surface tension and low viscosity.

Figure 3:
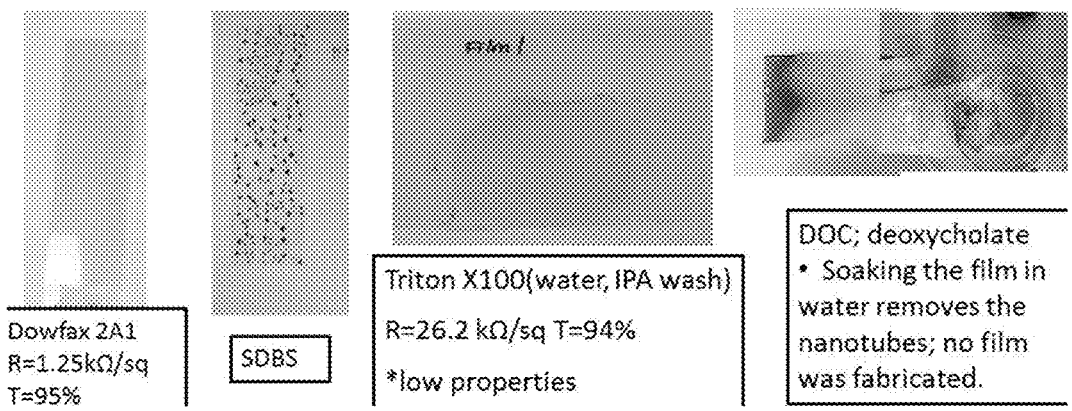
FIG. 3 illustrates films that are formed using an embodiment of the method of the present invention where the surfactant concentration is 1.0% wt.

In addition, for the films shown in FIG. 3, each film is manufactured by mixing an amount of 1.0% mass ratio of each surfactant (Dowfax™ 2 A1, SDBS, Triton™ X-100 and DOC) into 10 ml of water; adding 10 mg of CG301X carbon nanotubes (manufactured by SouthWest NanoTechnologies, Inc.) into the mixture; centrifuging the mixture of surfactant, water and carbon nanotubes at 10,000 g for 30 minutes; coating the resulting mixture on a PET substrate by using a Mayer rod coating machine (wet thickness is 13.72 μm, 1.2 inch/sec) to obtain a liquid film on the PET substrate; and drying the film on the substrate at 90° C. for 15 minutes. Each of the films was washed with water and/or IPA to remove the surfactant from the carbon nanotubes. When Dowfax™ 2 A1 was used as the surfactant to obtain the film on the PET substrate, a homogenous film with excellent properties was formed on the PET substrate. When Triton™ X-100 was used, a homogenous film on the PET substrate was obtained but shrinkage occurred. When DOC was used, a homogenous film on the PET substrate was obtained but carbon nanotubes were removed from the substrate during water washing. When sodium dodecylbenzene sulfonate (SDBS) was used to obtain the film on a plastic substrate, a homogeneous film was not obtained due to high surface tension and low viscosity.

The foregoing description of the present invention provides illustration and description, but is not intended to be exhaustive or to limit the invention to the precise one disclosed. Modifications and variations are possible in light of the above teachings or may be acquired from practice of the invention. Thus, it is noted that the scope of the invention is defined by the claims and their equivalents.

What is claimed is:

1. A composition comprising carbon nanotubes, a surfactant represented by the following formula,

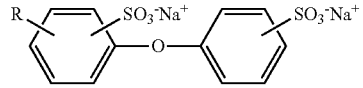

where R represents a branched alkyl group, and water, wherein the composition contains 0.05% weight to 0.2% weight of carbon nanotubes, and
the composition contains 0.05% by weight to 5% by weight of the surfactant.

2. A method of manufacturing a film on a substrate by using an aqueous dispersion containing a composition comprising carbon nanotubes, a surfactant represented by the following formula,

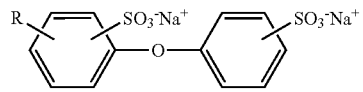

where R represents a branched alkyl group, and water,
wherein the composition contains 0.05% weight to 0.2% weight of carbon nanotubes, and
the composition contains 0.05% by weight to 5% by weight of the surfactant.

3. A film manufactured on a substrate by using the method of claim 2.

* * * * *